US011220149B2

(12) United States Patent
Feriani et al.

(10) Patent No.: US 11,220,149 B2
(45) Date of Patent: Jan. 11, 2022

(54) REAR AXLE ASSEMBLY DESIGNED TO FIT WITHIN REAR AXLE ENVELOPE

(71) Applicant: ZF Friedrichshafen AG, Friedrichshafen (DE)

(72) Inventors: Thiago Feriani, Hoschton, GA (US); Paul Lenz, Waldkirchen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/818,165

(22) Filed: Mar. 13, 2020

(65) Prior Publication Data

US 2020/0317014 A1    Oct. 8, 2020

Related U.S. Application Data

(60) Provisional application No. 62/817,839, filed on Mar. 13, 2019.

(51) Int. Cl.
*B60G 9/02* (2006.01)
*B60G 11/27* (2006.01)
(Continued)

(52) U.S. Cl.
CPC ............ *B60G 9/02* (2013.01); *B60B 35/122* (2013.01); *B60B 35/16* (2013.01); *B60G 11/27* (2013.01);
(Continued)

(58) Field of Classification Search
CPC .. B60G 9/02; B60G 11/27; B60G 2202/1524; B60G 2206/121; B60G 2202/152;
(Continued)

(56) References Cited

U.S. PATENT DOCUMENTS 2,902,291 A * 9/1959 Walker ................. B60G 17/052
280/6.159
3,515,405 A * 6/1970 Segar ....................... B62D 1/26
104/246
(Continued)

FOREIGN PATENT DOCUMENTS

DE    2552192 A1 * 6/1977 ............... B60G 9/02
DE    7807946 U1    10/1982
(Continued)

OTHER PUBLICATIONS

Machine Translation of FR2755065 (Year: 1998).*
(Continued)

*Primary Examiner* — James A English
*Assistant Examiner* — Kurtis Nielson
(74) *Attorney, Agent, or Firm* — Finch & Maloney, PLLC; Michael J. Bujold; Jay S. Franklin (57) ABSTRACT

A rear axle assembly designed to fit within a predefined rear axle envelope of a transportation vehicle. The rear axle assembly comprising first and second double wheel hubs each supporting a pair of tires, a rear axle offset with respect to a central axis of the rear axle assembly, a rear axle input for receiving a drive input, first and second portal housings which facilitate respectively connecting the rear axle with the first and the second double wheel hubs, a four-point control arm for connecting the rear axle to a chassis, first and second spring carriers each carrying smaller and larger diameter air bellows, first and second longitudinal arms which interconnected the rear axle to the chassis, and first and second shock absorbers each located generally at or adjacent to the central axis and radially between the first double wheel hub and the first spring carrier.

10 Claims, 6 Drawing Sheets

(51) Int. Cl.
*B60B 35/16* (2006.01)
*B60B 11/00* (2006.01)
*B60B 35/12* (2006.01)
*B60B 35/00* (2006.01)

(52) U.S. Cl.
CPC ............ *B60B 11/00* (2013.01); *B60B 35/004* (2013.01); *B60G 2200/322* (2013.01); *B60G 2202/152* (2013.01); *B60G 2202/1524* (2013.01); *B60G 2206/121* (2013.01); *B60G 2300/14* (2013.01)

(58) Field of Classification Search
CPC .......... B60G 2300/14; B60G 2200/322; B60B 35/16; B60B 35/122; B60B 11/00; B60B 35/004
See application file for complete search history.

(56) References Cited

U.S. PATENT DOCUMENTS

| | | | | |
|---|---|---|---|---|
| 4,869,176 | A * | 9/1989 | von Scarpatetti | B60G 7/001 104/247 |
| 5,433,287 | A | 7/1995 | Szalai et al. | |
| 6,843,746 | B2 * | 1/2005 | Hayes | B60B 35/002 184/6.12 |
| 7,048,087 | B2 * | 5/2006 | Brill | B60B 35/002 180/371 |
| 7,364,528 | B2 * | 4/2008 | Brill | B60B 11/02 180/378 |
| 8,919,793 | B1 * | 12/2014 | Klein | B60G 7/008 280/124.116 |
| 2003/0122340 | A1 * | 7/2003 | Varela | B60G 3/20 280/124.135 |
| 2003/0155170 | A1 * | 8/2003 | Smith | B60K 17/043 180/348 |
| 2003/0173137 | A1 * | 9/2003 | Bennett | B60K 17/043 180/358 |
| 2016/0280026 | A1 * | 9/2016 | Phillips | B60G 9/02 |

FOREIGN PATENT DOCUMENTS

| | | | | |
|---|---|---|---|---|
| DE | 29603240 | U1 * | 9/1996 | ............. B60G 5/047 |
| DE | 10034751 | A1 * | 1/2002 | ................ B60T 1/02 |
| DE | 102004003631 | A1 * | 8/2005 | ............. B60T 1/065 |
| DE | 102014011803 | A1 | 2/2016 | |
| EP | 0599293 | A1 * | 6/1994 | ............. B60K 17/04 |
| EP | 1231083 | A2 * | 8/2002 | ................ B60G 9/00 |
| FR | 2755065 | A3 * | 4/1998 | .......... B60G 17/052 |
| JP | H10218012 | A | 8/1998 | |

OTHER PUBLICATIONS

Machine Translation of DE29603240 (Year: 1996).*
German Search Report issued in corresponding German Patent Application No. 10 2020 203 251.3 dated May 20, 2020.

* cited by examiner

REAR AXLE ASSEMBLY DESIGNED TO FIT WITHIN REAR AXLE ENVELOPE

FIELD OF THE INVENTION

The present disclosure relates to improvements relating to a rear axle assembly designed to fit within a predefined rear axle envelope of a public transportation vehicle.

BACKGROUND OF THE INVENTION

Rear axle assemblies are widely used to enhance public transport, to speed up the passenger traffic, to make the entry to and exit from a public transportation vehicle easier. One advantage of a portal arrangement is in that the floor height of the vehicle can be as low as 320 to 350 mm (12.60 to 13.78 inches), measured from the ground level, so there typically is only one step needed in order for a passenger to step up from the ground onto the bus. However, certain difficulties are encountered with driven rear axles of the vehicles since there must not only be required space for the drive input, but the rear axle must also be sufficient stability and rigid to withstand normal as well as extreme operating conditions.

In the bus construction industry, the bus manufactures typically do not wish to manufacture the necessary support and suspension elements themselves and it is often inconvenient for such bus manufactures to procure the necessary components from outside suppliers. Moreover, the bus construction industry generally desires that producers of rear axle assemblies provide their assemblies as a complete finished and assembled unit which has all of the associated components, connection points, suspension elements, etc., already on the rear axle assembly so that the rear axle assembly, upon receipt by the bus manufacture, is immediately ready for installation.

In addition, due to the design of the bus, or other vehicle, which is to incorporate the rear axle assembly, there is a limit amount of available space, e.g., a rear axle envelope, which is available to receive and accommodate the rear axle assembly. The rear axle assembly must be able to readily and reliably fit and properly function within the available space of the bus, or other vehicle, without requiring any modification of the existing available space and without malfunctioning.

SUMMARY OF THE INVENTION

Wherefore, it is an object of the present disclosure to overcome the above mentioned shortcomings and drawbacks associated with the prior art.

Another object of the present disclosure is to rotate the portal housing by an angle of 90° so as to reduce the input shaft angle and, in turn, thereby improve the ride provided by the rear axle assembly while also reducing the noise level of the driveline of the vehicle.

A further object of the present disclosure is to rotate the air brake chamber for the brakes in a downward direction by an angle of between 25° and 5°, more preferably about 15° or so, such that the axis of each the air brake chambers lies substantially parallel to the ground and thereby provide additional space for the rear air bellows of the rear axle assembly.

Yet another object of the present disclosure is to select or utilize air bellows which have different sizes and/or geometries, e.g., typically utilize a first pair of relatively smaller diameter air bellows (e.g., 250 mm (9.84 inches) in diameter) toward the rear of the rear axle assembly, which each have a relatively tall vertical height or profile, and also utilize a second pair of larger diameter air bellows (e.g., 350 mm (13.78 inches) in diameter) toward the front of the rear axle assembly, which each have a relatively short vertical height or profile to facilitate fitting the associated air bellows within the allocated rear axle envelope.

A still further object of the present disclosure is to locate or arrange the longitudinal rods so that each one of the longitudinal rods is located between the double hub/pair of adjacent tires and the first and second pair of adjacent relatively larger and smaller diameter air bellows so as to provide superior longitudinal force support for the rear axle assembly.

Still another object of the present disclosure is to utilize only one pair of shock absorbers for the rear axle assembly and to locate each one of the shock absorbers spaced apart from one another generally at or relatively close to the central axis of the rear axle assembly, between one of the longitudinal rods and the spring carriers for the air bellows, and thereby simplify the overall design of the rear axle assembly while, at the same time, still providing superior shock absorbing performance.

The present disclosure also relates to a rear axle assembly designed to fit within a predefined envelope of a transportation vehicle, the rear axle assembly comprising: first and second double wheel hubs which form the rear axle output, each one of the first and the second double wheel hubs respectively supporting a pair of tires for engagement with the ground, and the first and the second double wheel hubs defining a central axis of the rear axle assembly; a rear axle being offset with respect to the central axis; the rear axle having a rear axle input for receiving a drive input from a motor or an engine; a first portal housing being located at first end of the rear axle to facilitate connecting the rear axle the first double wheel hub and a second portal housing being located at second end of the rear axle to facilitate connecting the rear axle the second double wheel hub; a four-point control arm being connected to the rear axle at two spaced apart locations while two additional spaced apart locations of the four-point control arm facilitate connection of the rear axle assembly to a chassis of a transportation vehicle; spaced apart first and second spring carriers each having a central region connected to the rear axle, while a first end of each ofthe first and the second spring carriers carries a first relatively smaller diameter air bellow and a second end of each of the first and the second spring carriers carries a second relatively larger diameter air bellow; and first and second longitudinal arms which interconnected the rear axle to the chassis of the transportation vehicle; first and second shock absorbers each located generally at or adjacent to the central axis, and the first shock absorber is located radially between the first double wheel hub and the first spring carrier.

The present disclosure also relates to a rear axle assembly designed to fit within a predefined envelope of a transportation vehicle, the rear axle assembly comprising: first and second double wheel hubs which form the rear axle output, each one of the first and the second double wheel hubs respectively supporting a pair of tires for engagement with the ground, and the first and the second double wheel hubs defining a central axis of the rear axle assembly; a rear axial being offset with respect to the central axis; the rear axle having a rear axle input for receiving a drive input from a motor or an engine; a first portal housing being located at first end of the rear axle to facilitate connecting the rear axial the first double wheel hub and a second portal housing being located at second end of the rear axle to facilitate connecting the rear axle the second double wheel hub; a four-point control arm being connected to the rear axle at two spaced apart locations while two additional spaced apart locations of the four-point control arm facilitate connection of the rear axle assembly to a chassis of a transportation vehicle; spaced apart first and second spring carriers each having a central region connected to the rear axle, while a first end of each of the first and the second spring carriers carries a first relatively smaller diameter air bellow and a second end of each of the first and the second spring carriers carries a second relatively larger diameter air bellow; and first and second longitudinal arms which interconnected the rear axle to the chassis of the transportation vehicle; first and second shock absorbers each located generally at or adjacent to the central axis, and the first shock absorber is located radially between the first double wheel hub and the first spring carrier.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which.

DETAILED DESCRIPTION OF THE PREFERRED EMBODIMENTS

The present disclosure will be understood by reference to the following detailed description, which should be read in conjunction with the appended drawings. It is to be appreciated that the following detailed description of various embodiments is by way of example only and is not meant to limit, in any way, the scope and content of the present disclosure.

Turning now to FIGS. 1-4, a brief description concerning the various components of the present disclosure will now be briefly discussed. As can be seen in this embodiment, the present disclosure relates to a rear axle assembly 2 which generally comprises an offset rear axle 4, e.g., a central axis of the rear axle 4 is offset between 101 mm 178 mm and (4 and 7 inches) with respect to a central axis A defined by the rear axle assembly 2. A portal housing 6 is located at each opposed end of the rear axle 4 and each portal housing 6 facilitates connecting the rear axle 4 to a respective pair of double wheel hubs 8 which form the rear axle output. As is conventional in the art, each one of the wheel hubs 8 supports a respective pair of tires 10 which engage with the ground or pavement.

A central section of the rear axle 4 has a rear axle input 12 (see FIG. 1A, for example) which is arranged to receive a drive input (not shown in detail) from a motor or an engine (not shown in detail) in a conventional manner. It is to be appreciated that, if necessary the rear axle assembly 2 may be rotated slightly, e.g., by a few degrees or so, to ensure that the axle input 12 is precisely axially aligned with the drive input (not shown in detail) from the motor or the engine in order to reduce noise as well as associated wear and tear of the rear axle assembly 2. The rear axle input 12, in turn, is connected to drive a conventional rear axle differential 14 (only partially shown), accommodated within the rear axle 4, which supplies rotational drive, via the portal housing 6 and associated gears, to each one of the pair of double wheel hubs 8 and associated tires 10 to propel the transportation vehicle 14 (only diagrammatically shown) in a desired direction.

Figure 2:
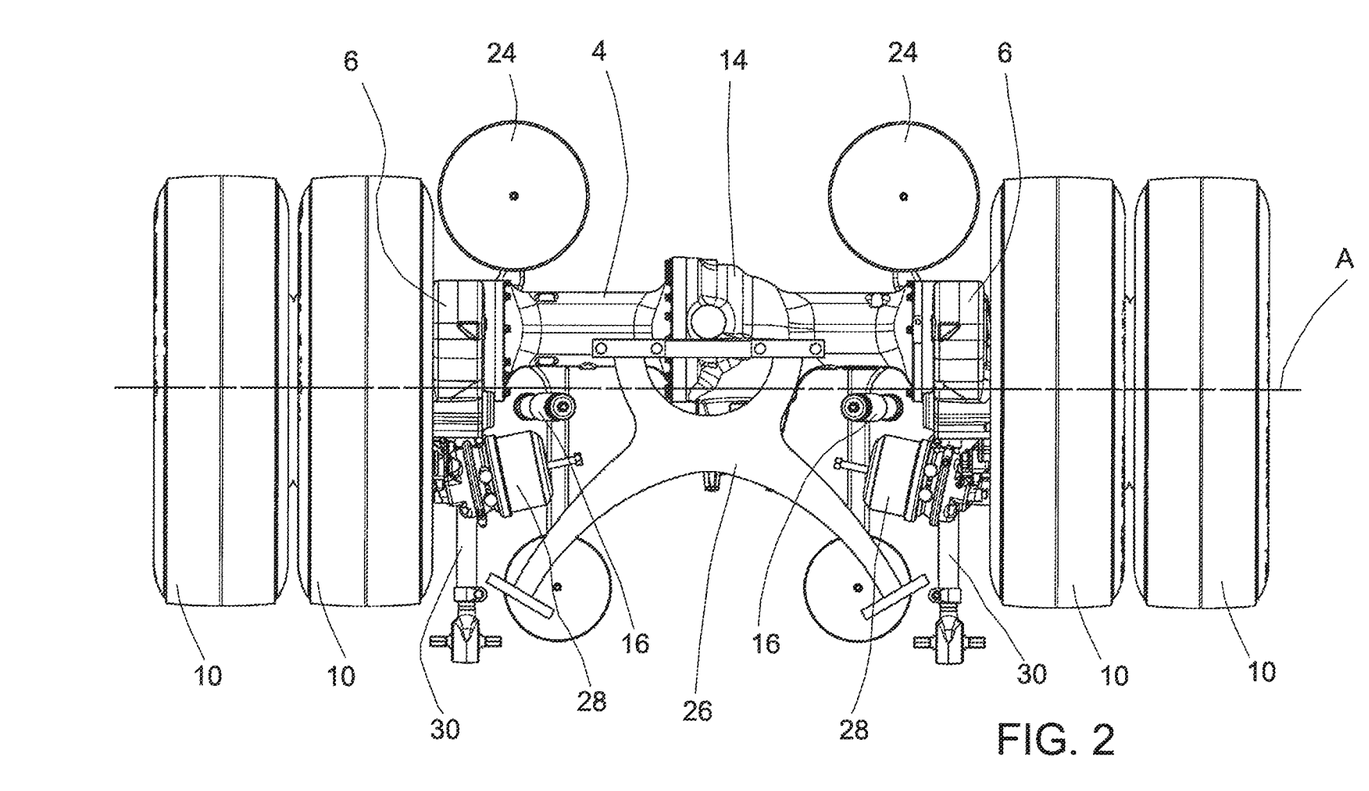
FIG. 2 is a diagrammatic top plan view of the rear axle assembly of FIG. 1.

As shown in FIG. 2 for example, the rear axle 4 is offset in a direction toward the rear portion of the transportation vehicle 14 so that a central axis of the rear axle 4 is offset with respect to a rotational axis of the double wheel hubs 8 and associated tires 10. This arrangement provides additional space for accommodating a pair of shock absorbers 16 and other the rear axle components, as will be discussed below in further detail.

Figure 3:
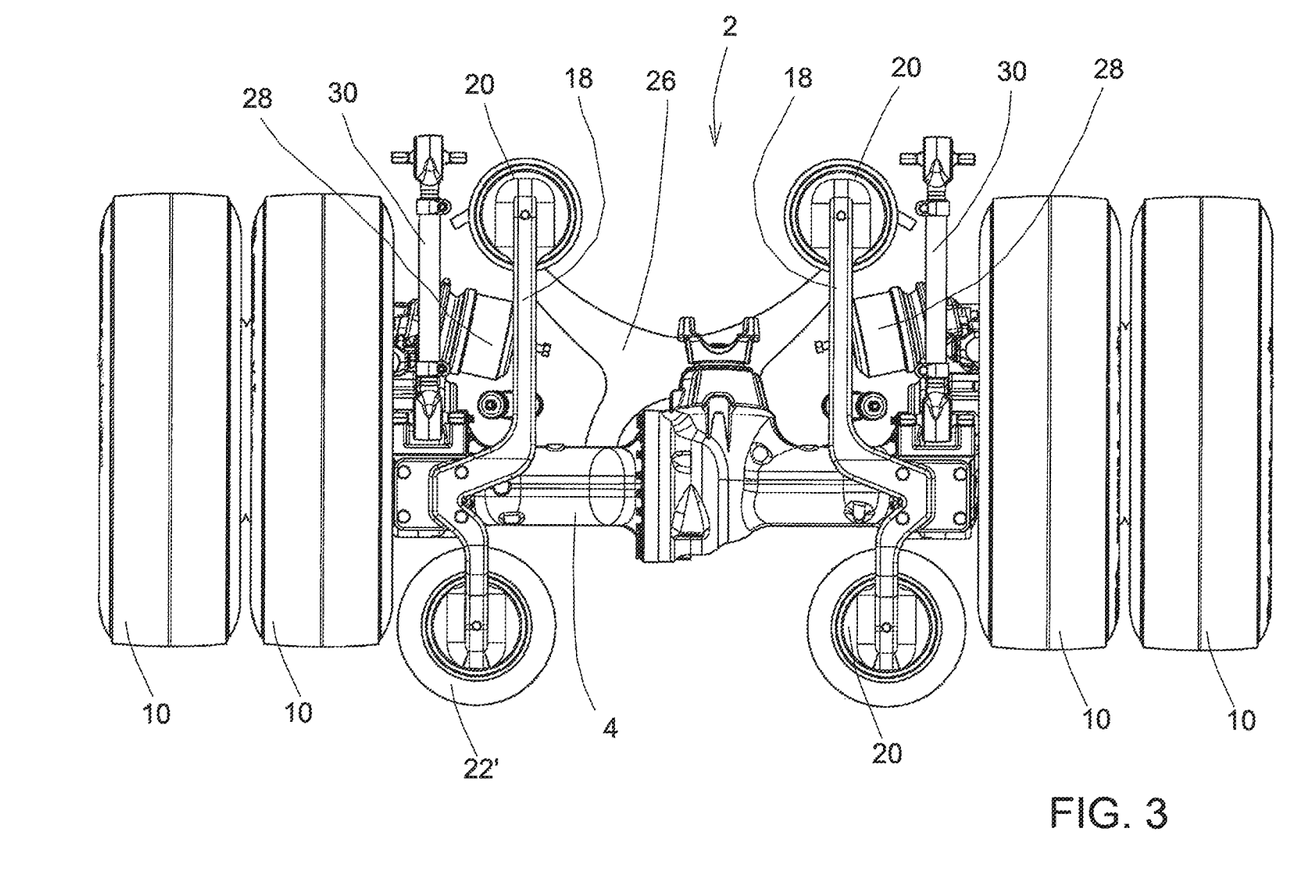
FIG. 3 is a diagrammatic bottom plan view of the rear axle assembly of FIG. 1.
Figure 4:
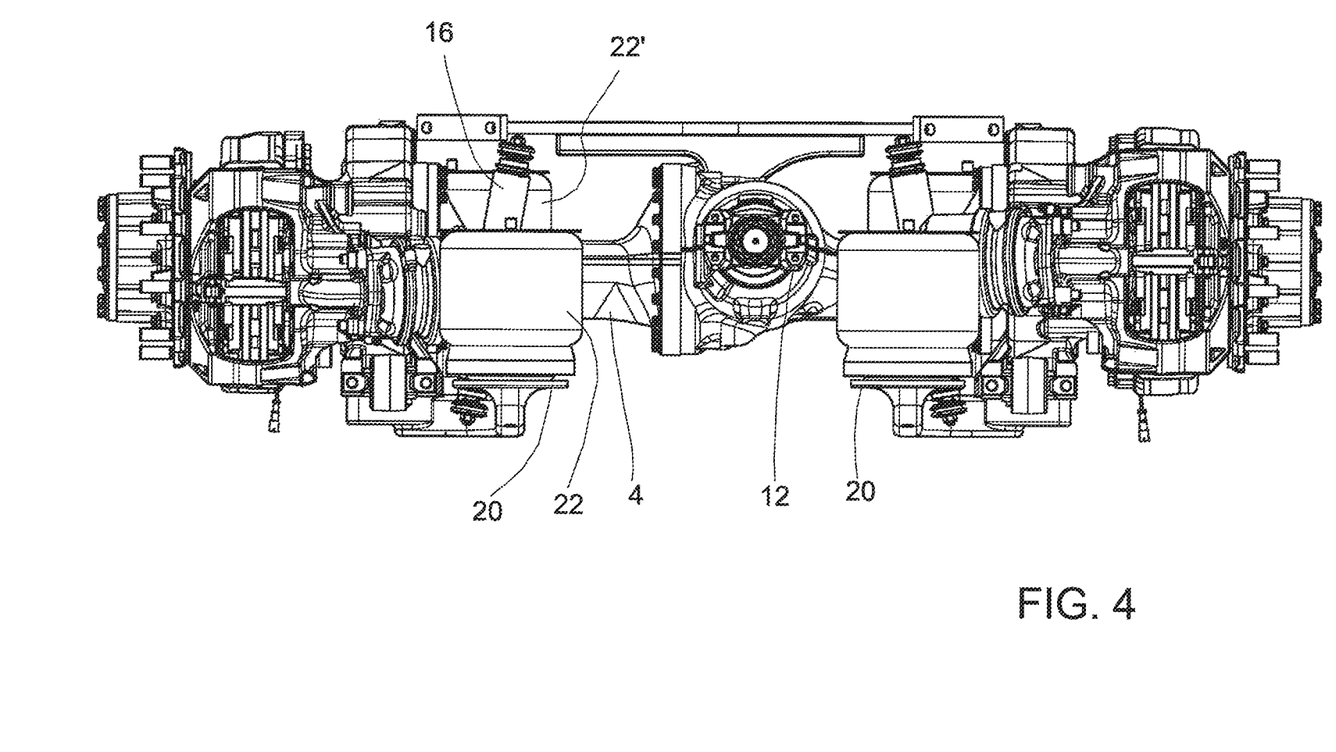
FIG. 4 is a diagrammatic front elevational view of the rear axle assembly, similar to FIG. 1, with the associated wheel removed and a central axis of the rear axle assembly shown; and It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

As shown in FIG. 3 for example, the rear axle assembly 2 comprises first and second spaced apart but generally parallel extending spring carriers 18. An upwardly facing central region of each one of the spring carriers 18 is fixedly connected to the rear axle 4, in a conventional manner, while each opposed end of each one of the spring carriers 18 terminates as a generally circular disk 20. A vertically upwardly facing surface of each circular disk 20 supports an associated one of the first and the second air bellows 22, 22'. An opposed upwardly facing surface 24 of each associated air bellows 22, 22' engages with a vertically downwardly facing surface of the chassis (not shown). When the chassis experience a downwardly directed force during operation, such downwardly directed force is transferred from the chassis to the air bellows 22, 22' and absorbed.

It is noted that the air bellows 22, 22', supported at each opposed end of each of the spring carriers 18, have different sizes and/or geometries from one another. That is, the first air bellow 22 is located closer to a rear of the transportation vehicle 14 and has a smaller diameter, e.g., a diameter of about 250 mm (9.84 inches) for example, but has a relatively taller vertical height or profile, e.g., a vertical height of between 250 mm (9.84 inches) and 280 mm (11.02 inches), while the second air bellow 22' is located closer to a front of the transportation vehicle 14 and has a larger diameter, e.g., a diameter of 350 mm (13.78 inches) for example, but has a relatively short vertical height or profile, e.g., a vertical height of between 230 mm (9.06 inches) and 280 mm (11.02 inches). While the first and the second air bellows 22, 22' have different sizes and/or geometries from one another as well as different spacing from the central axis A of the rear axle assembly 2, it is to be appreciated that both the first and the second air bellows 22, 22' are designed to provide substantially the same damping effect for the chassis, e.g., both air bellows 22, 22' absorb or dampen a different amount of force but bring the axle, with respect to the rotation center of wheels, in balance. The relative torque of both air springs, with respect to the rotation of wheels, is substantially the same.

As can be seen in FIG. 2, it is to be appreciated that the first pair of relatively smaller diameter air bellows 22' are located as far as possible from the central axis A of the rear axle assembly 2, e.g., a vertical extending axis of each of the second larger diameter air bellows 22' is spaced between 500 mm (19.7 inches) and 700 mm (29.6 inches), typically about 600 mm (23.6 inches) from the central axis A of the rear axle assembly 2 while the second pair of relatively larger diameter air bellows 22 are located relatively close to the central axis A of the rear axle assembly 2, e.g., a vertical extending axis of each of the first larger diameter air bellows 22 is spaced between 200 mm (7.9 inches) and 400 mm (15.7 inches), typically about 310 mm (12.2 inches) from the central axis A of the rear axle assembly 2. As noted above, the first and the second air bellows 22' are designed and arranged to balance the axle during operation (during bump in and bump out with respect to a rotational center of the wheels).

As is conventional in the art, the rear axle assembly 2 is provided with a conventional four-point control arm 26. The four-point control arm 26 is pivotally connected to the rear axle 4 at two spaced apart locations while two additional spaced apart locations of the four-point control arm 26 are connected to a downwardly facing surface of a chassis of the transportation vehicle 14 during installation. As is well known in the art, the four-point control arm 26 control and limits pivoting movement of rear axle 4 so as to improve the ride and comfort of the transportation vehicle 14 during operation of the rear axle assembly 2.

In order to provide additional space for the various components of the rear axle assembly 2 so as to fit within the allotted rear axle envelope (see FIG. 1A), a longitudinal axis of each of the first and second air brake chambers 28, which respectively receive and provide compressed air to the conventional brake (not shown in detail) of the double wheel hubs 8 and associated tires 10, to brake, slow or discontinue rotation thereof, extends substantially horizontally to the ground. The arrangement of the air brake chambers 28 avoids either one of the air brake chambers 28 from interfering with installation or operation of the longitudinal rods 30, for example, discussed below.

As noted above, the rear axle assembly 2 is typically provided with only one pair of shock absorbers 16. Each one of the shock absorbers 16 is located generally at or relatively close to the central axis A of the rear axle assembly 2 as well as relatively close to one of the double wheel hubs 8 and associated tires 10. The shock absorbers 16 provide the desired shock absorbing effect, in a conventional manner, during operation of the transportation vehicle 14 substantially at the central axis A. As shown in FIG. 2, each shock absorber 16 is typically located between an adjacent longitudinal rod 30 and the spring carrier 18 for the first and the second air bellows 22, 22', which simplifies the overall design of the rear axle assembly 2 while, at the same time, still provides superior shock absorbing performance for the transportation vehicle 14 by the rear axle assembly 2.

As shown in FIG. 2, each of the first and second longitudinal arms 30 interconnects an upper portion of the rear axle 4 with the chassis of the transportation vehicle 14 during installation. The first and second longitudinal arms 30 typically extending generally parallel to one another and adjacent the chassis of the transportation vehicle 14. The first longitudinal arm 30 is located radially between the first double wheel hub 8 and the associated tires 10 and the first spring carrier 18 which carries the first and the second air bellows 22, 22', the while second longitudinal arm 30 is located between the second double wheel hub 8 and the associated tires 10 and the second spring carrier 18 which carries the first and the second air bellows 22, 22'. As is conventional in the art, the first and the second longitudinal arms 30 are designed to improve the ride and comfort of transportation vehicle 14.

Figure 1:
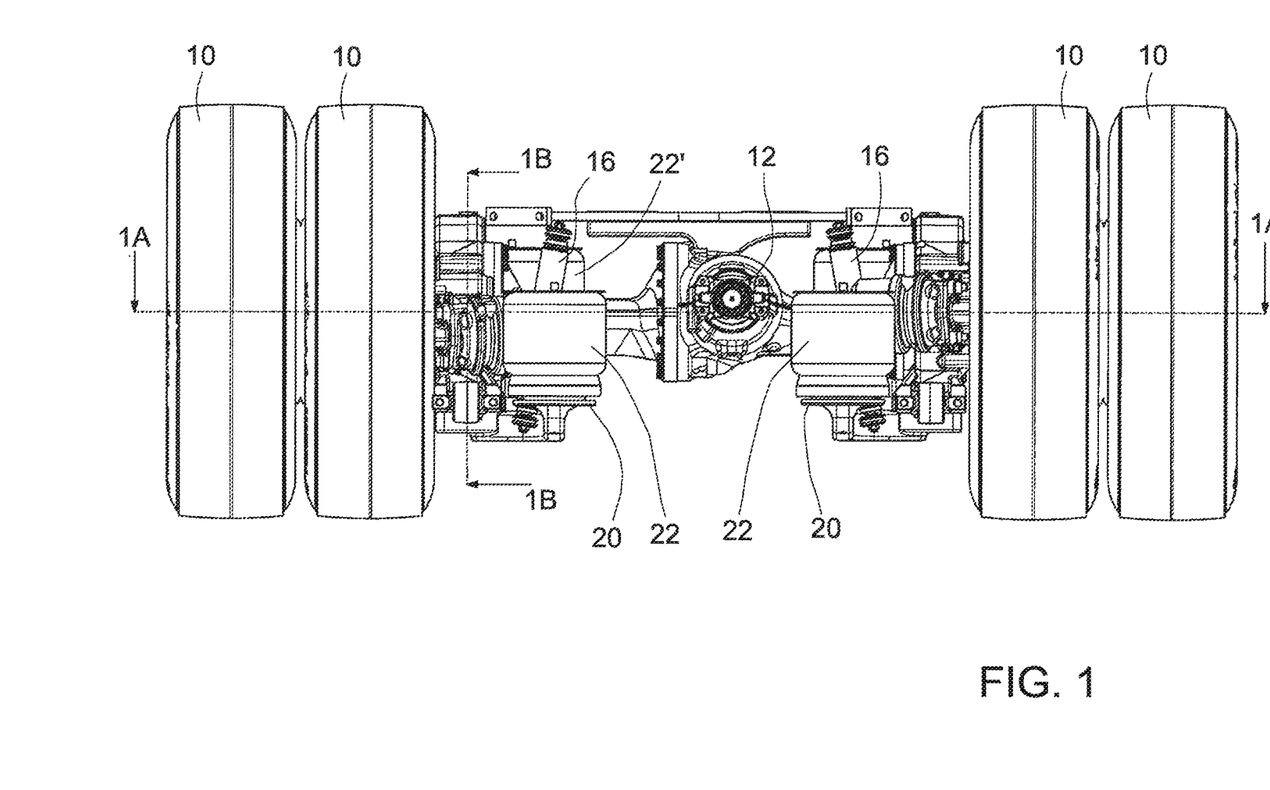
FIG. 1 is a diagrammatic rear elevational view of the rear axle assembly according to the present disclosure.
Figure 1A:
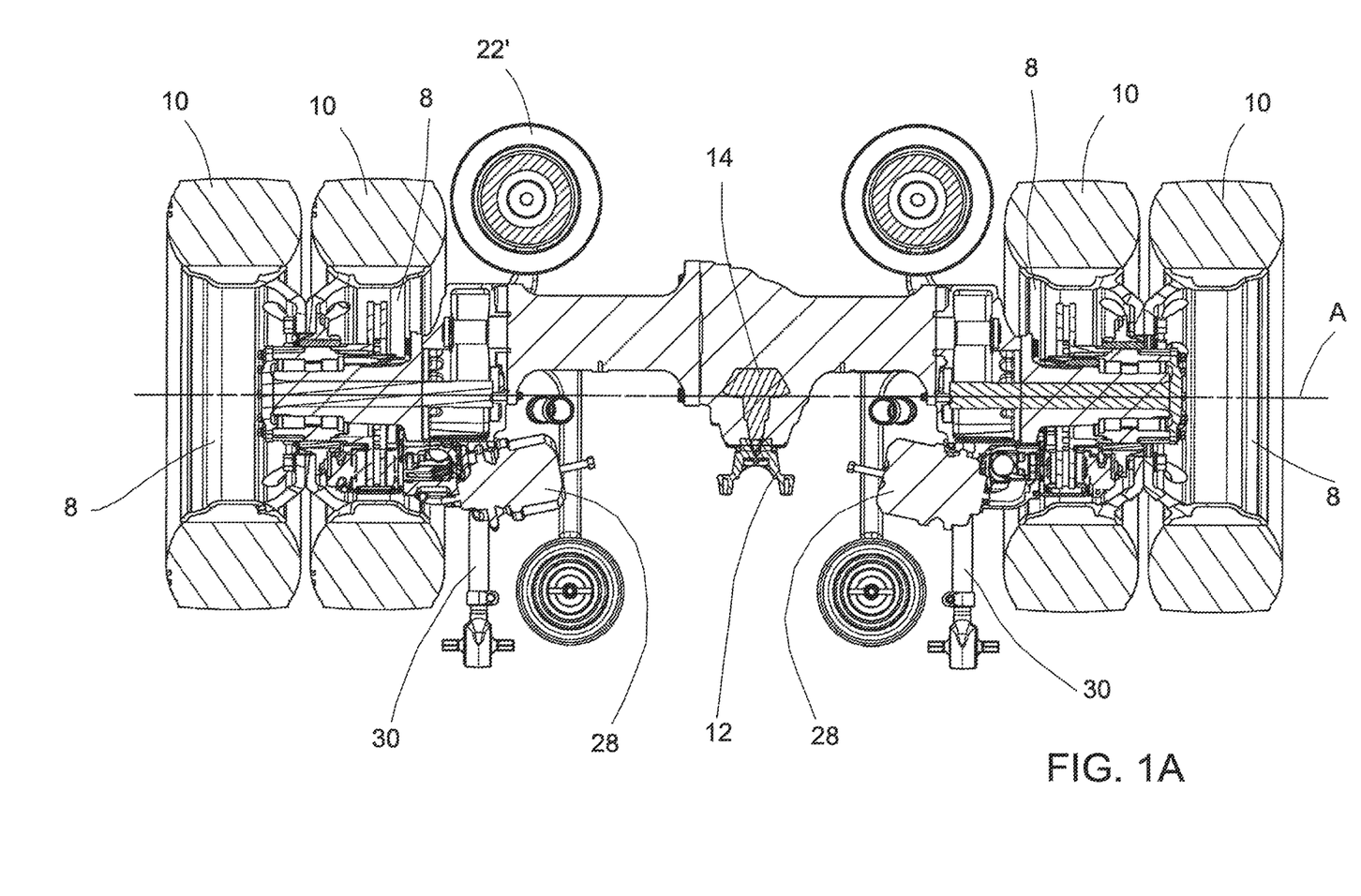
FIG. 1A is a diagrammatic cross-sectional view of the rear axle assembly along section line 1A-1A of FIG. 1.
Figure 1B:
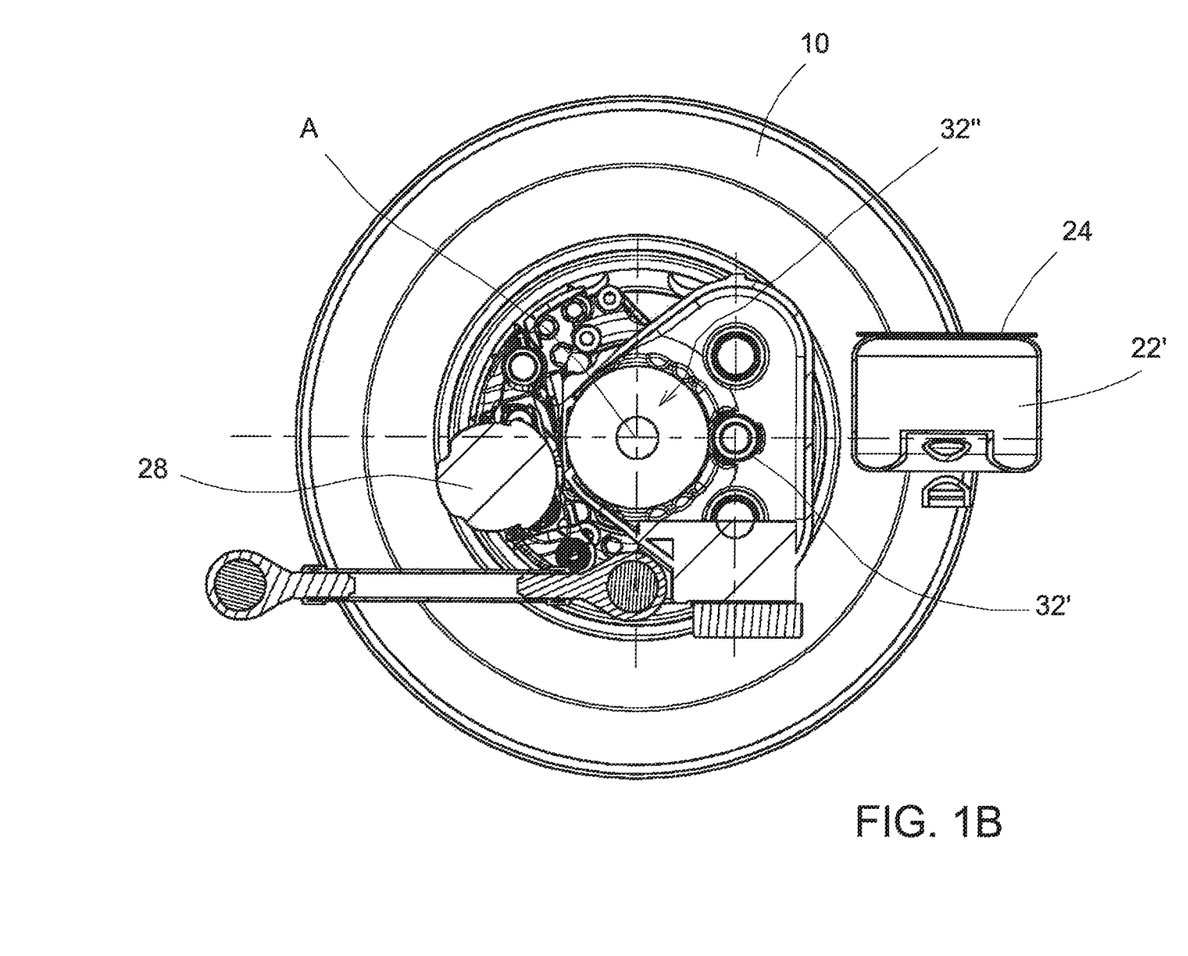
FIG. 1B is a diagrammatic cross-sectional view of the portal housing of the rear axle assembly along section line 1B-1B of FIG. 1 showing the rotational axis of the input gear being arranged in substantially the same horizontal plane as the rotational axis of the output gear for the portal housing.

As noted above, a respective portal housing 6 is located at each opposed end of the rear axle 4. As shown in FIG. 1B, the portal housing 6 accommodates a plurality of gears 32, e.g., typically four internal gears. The plurality of gears provide a desired gear reduction ratio for the rear axle assembly 2 which reduces the rotational speed of the input gear 32' typically by a ratio of between 4:1 and 10:1 so that the output gear 32" rotates at a slower rotational speed. The output gear 32" is directly coupled to and drives the double wheel hub 8 and the associated tires 10.

One modification, according to the disclosure, relates to rotation of the portal housing 6 by approximately 90 degrees, with respect to a conventional portal housing, so that a rotational axis of the input gear 32' of the portal housing 6 and a rotational axis of the output gear 32" of the portal housing 6 extend parallel to one another and together define a plane P which extends parallel to the ground. Such arrangement of the input gear 32' and the output gear 32" of the portal housing 6 minimizes the generation of noise along the driveline as well as reduces wear and tear of the various components during operation of the rear axle assembly 2.

While various embodiments of the present disclosure have been described in detail, it is apparent that various modifications and alterations of those embodiments will occur to and be readily apparent to those skilled in the art. However, it is to be expressly understood that such modifications and alterations are within the scope and spirit of the present disclosure, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Wherefore, we claim:

1. A rear axle assembly designed to fit within a predefined envelope of a transportation vehicle, the rear axle assembly comprising:
   first and second double wheel hubs which form a rear axle output, each one of the first and the second double wheel hubs respectively supporting a pair of tires for ground engagement, and the first and the second double wheel hubs defining a central axis of the rear axle assembly;
   a rear axle being offset with respect to the central axis;
   the rear axle having a rear axle input for receiving a drive input from a motor or an engine;
   a first portal housing being located at a first end of the rear axle to facilitate connecting the rear axle and the first double wheel hub, and a second portal housing being located at a second end of the rear axle to facilitate connecting the rear axle and the second double wheel hub;
   a four-point control arm being connected to the rear axle at two spaced apart locations while two additional spaced apart locations of the four-point control arm facilitate connection of the rear axle assembly to a chassis of the transportation vehicle;
   spaced apart first and second spring carriers each having a central region connected to the rear axle, while a first end of each of the first and the second spring carriers carries a first relatively smaller diameter air bellow and a second end of each of the first and the second spring carriers carries a second relatively larger diameter air bellow, the first air bellow has the relatively smaller diameter and a relatively taller vertical height or profile while the second air bellow has the relatively larger diameter and a relatively shorter vertical height or profile;
   first and second longitudinal arms which interconnect the rear axle to the chassis of the transportation vehicle; and
   first and second shock absorbers each located generally at or adjacent to the central axis, and the first shock absorber is located radially between the first double wheel hub and the first spring carrier.

2. The rear axle assembly according to claim 1, wherein the first and the second air bellows have at least one of different sizes and geometries from one another as well as different spacing from the central axis of the rear axle assembly, and both the first and the second air bellows bring the rear axle in balance during bump in and bump out operations with respect to a rotational center of the wheel hubs.

3. The rear axle assembly according to claim 1, wherein a vertical axis of each of the first relatively smaller diameter air bellows is spaced between 500 mm (19.7 inches) and 700 mm (29.6 inches) away from the central axis of the rear axle assembly, and each of the second relatively larger diameter air bellows is spaced between 200 mm (7.9 inches) and 400 mm (15.7 inches) away from the central axis of the rear axle assembly.

4. The rear axle assembly according to claim 1, wherein the rear axle assembly further comprises first and second air brake chambers, which respectively receive and supply compressed air to a brake of the double wheel hub to brake the transportation vehicle, and each one of the first and the second air brake chambers extends substantially horizontally to the ground and toward one another.

5. The rear axle assembly according to claim 1, wherein the rear axle input is connected to drive a rear axle differential, accommodated within the rear axle, which supplies rotational drive, via the first and the second portal housings, to each of the first and second double wheel hubs and associated tires to propel the transportation vehicle in a desired direction.

6. The rear axle assembly according to claim 1, wherein the rear axle is offset in a direction toward a rear portion of the transportation vehicle between 101 mm (4 inches) and 178 mm (7 inches) with respect to the central axis of the rear axle assembly.

7. The rear axle assembly according to claim 6, wherein the first longitudinal arm is located radially between the first double wheel hub and the first spring carrier which carries the first and the second air bellows, and the second longitudinal arm is located between the second double wheel hub and the second spring carrier which carries the first and the second air bellows.

8. The rear axle assembly according to claim 1, wherein the first and the second longitudinal arms extend substantially parallel to one another and adjacent the chassis of the transportation vehicle.

9. A rear axle assembly designed to fit within a predefined envelope of a transportation vehicle, the rear axle assembly comprising:
   first and second double wheel hubs which form a rear axle output, each one of the first and the second double wheel hubs respectively supporting a pair of tires for ground engagement, and the first and the second double wheel hubs defining a central axis of the rear axle assembly;
   a rear axle being offset with respect to the central axis;
   the rear axle having a rear axle input for receiving a drive input from a motor or an engine;
   a first portal housing being located at a first end of the rear axle to facilitate connecting the rear axle and the first double wheel hub, and a second portal housing being located at a second end of the rear axle to facilitate connecting the rear axle and the second double wheel hub;
   a four-point control arm being connected to the rear axle at two spaced apart locations while two additional spaced apart locations of the four-point control arm facilitate connection of the rear axle assembly to a chassis of the transportation vehicle;
   spaced apart first and second spring carriers each having a central region connected to the rear axle, while a first end of each of the first and the second spring carriers carries a first relatively smaller diameter air bellow and a second end of each of the first and the second spring carriers carries a second relatively larger diameter air bellow;
   first and second longitudinal arms which interconnect the rear axle to the chassis of the transportation vehicle;
   first and second shock absorbers each located generally at or adjacent to the central axis, and the first shock absorber is located radially between the first double wheel hub and the first spring carrier; and
   the first pair of smaller diameter air bellows are located further away from the central axis of the rear axle assembly, and the second pair of larger diameter air bellows are located relatively closer to the central axis of the rear axle assembly.

10. A rear axle assembly designed to fit within a predefined envelope of a transportation vehicle, the rear axle assembly comprising:

first and second double wheel hubs which form a rear axle output, each one of the first and the second double wheel hubs respectively supporting a pair of tires for ground engagement, and the first and the second double wheel hubs defining a central axis of the rear axle assembly;

a rear axle being offset with respect to the central axis;

the rear axle having a rear axle input for receiving a drive input from a motor or an engine;

a first portal housing being located at a first end of the rear axle to facilitate connecting the rear axle and the first double wheel hub, and a second portal housing being located at a second end of the rear axle to facilitate connecting the rear axle and the second double wheel hub;

a four-point control arm being connected to the rear axle at two spaced apart locations while two additional spaced apart locations of the four-point control arm facilitate connection of the rear axle assembly to a chassis of the transportation vehicle;

spaced apart first and second spring carriers each having a central region connected to the rear axle, while a first end of each of the first and the second spring carriers carries a first relatively smaller diameter air bellow and a second end of each of the first and the second spring carriers carries a second relatively larger diameter air bellow;

first and second longitudinal arms which interconnect the rear axle to the chassis of the transportation vehicle;

first and second shock absorbers each located generally at or adjacent to the central axis, and the first shock absorber is located radially between the first double wheel hub and the first spring carrier; and the rear axle is offset in a direction toward a rear portion of the transportation vehicle.

* * * * *